United States Patent [19]

Smith

[11] 3,805,860

[45] Apr. 23, 1974

[54] APPARATUS FOR SEVERING AND GROUPING TREES

[75] Inventor: Leward N. Smith, Remus, Mich.

[73] Assignee: Morbark Industries, Inc., Winn, Mich.

[22] Filed: Apr. 11, 1972

[21] Appl. No.: 243,005

[52] U.S. Cl. .......... 144/3 D, 144/34 R, 144/309 AC
[51] Int. Cl. ............................................. A01g 23/08
[58] Field of Search .. 144/3 D, 34 R, 34 E, 309 AC

[56] References Cited
UNITED STATES PATENTS

| | | | |
|---|---|---|---|
| 3,664,391 | 5/1972 | Coffey | 144/34 R |
| 3,277,936 | 10/1966 | Larson | 144/3 D |
| 3,140,736 | 7/1964 | Propst | 144/3 D |
| 3,385,333 | 5/1968 | Eynon | 144/3 D |
| 3,468,352 | 9/1969 | Larson et al. | 144/3 D |

Primary Examiner—Gerald A. Dost
Attorney, Agent, or Firm—Learman & McCulloch

[57] ABSTRACT

Apparatus for successively severing trees while supporting a plurality of previously severed trees including a tree shearing head for successively shearing trees and a gathering assembly having articulated, withdrawals, rigid, grouping finger parts forming an articulated holding finger for holding severed trees while a successive tree to be severed and grouped therewith is held against the holding finger. Separate withdrawing forces are applied to the finger parts to "snake" the parts out to a removed position permitting the trees to the grouped. The entire group of trees is then deposited on the ground in position to be picked up by other equipment.

12 Claims, 5 Drawing Figures

APPARATUS FOR SEVERING AND GROUPING TREES

THE FIELD OF THE INVENTION

This invention relates to tree severing apparatus, and more particularly to apparatus for successively severing growing trees and grouping the successively severed trees.

THE BACKGROUND OF THE INVENTION

Tree felling apparatus, such as that disclosed in U.S. Pat. No. 3,575,222, granted on Apr. 20, 1971, accomplishes the felling of trees with a shearing head, but, after each tree is severed, it must be released before another tree can be cut. The severed trees can either be released at the immediate cutting site and subsequently individually picked up, or else the felling vehicle can be moved back and forth to a common grouping location before it releases the severed trees. Either mode of operation requires substantial maneuvering of the tree felling apparatus and reduces the tree processing efficiency of the machine especially when relatively small diameter trees are being felled. Accordingly, it is an object of the present invention to provide tree shearing and grouping apparatus which will reduce the processing time required to fell and group trees and, in fact, more than double production.

It is another object of the present invention to provide shearing and grouping apparatus which will shear trees and accumulate a plurality of trees in vertical position.

It is a further object of the present invention to provide tree severing and accumulating apparatus including an articulated holding finger assembly which holds severed trees while additional trees to be grouped therewith and held by the finger assembly are being severed.

It is yet another object of the present invention to provide apparatus, disposed vertically interjacent a tree shearer and openable tree gripping claws, for holding severed trees while subsequent trees are being severed.

A still further object of the present invention is to provide a method and apparatus for clamping a tree at the end of a boom with a first clamp, severing the clamped tree, releasing the first clamp after the tree has been severed, gripping the severed tree with a second clamp, holding the severed tree at the end of the boom while a subsequent tree to be severed and grouped with the previously severed tree is being held by the first clamp.

Other objects and advantages of the present invention will become apparent as the description thereof proceeds.

SUMMARY OF THE INVENTION

Apparatus for use at the end of a boom, movably mounted on a logging vehicle, for severing trees and gathering the severed trees comprising: tree gripping means for successively grasping trees to be severed and successively releasing them after they are severed; tree shear means disposed below the tree-gripping means for severing a tree held by the tree-gripping means; articulated withdrawable, riged, grouped finger parts forming a finger for successively receiving, severed trees released by the tree-gripping means in vertical disposition and embracing and holding the severed trees while a successive tree to be severed and grouped therewith is being held by the tree-gripping means; and means for applying separate withdrawing forces to the finger parts to snake them out from between the trees.

The present invention may more readily be described by reference to the accompanying drawings in which.

DESCRIPTION OF THE PREFERRED EMBODIMENT

Figure 1:
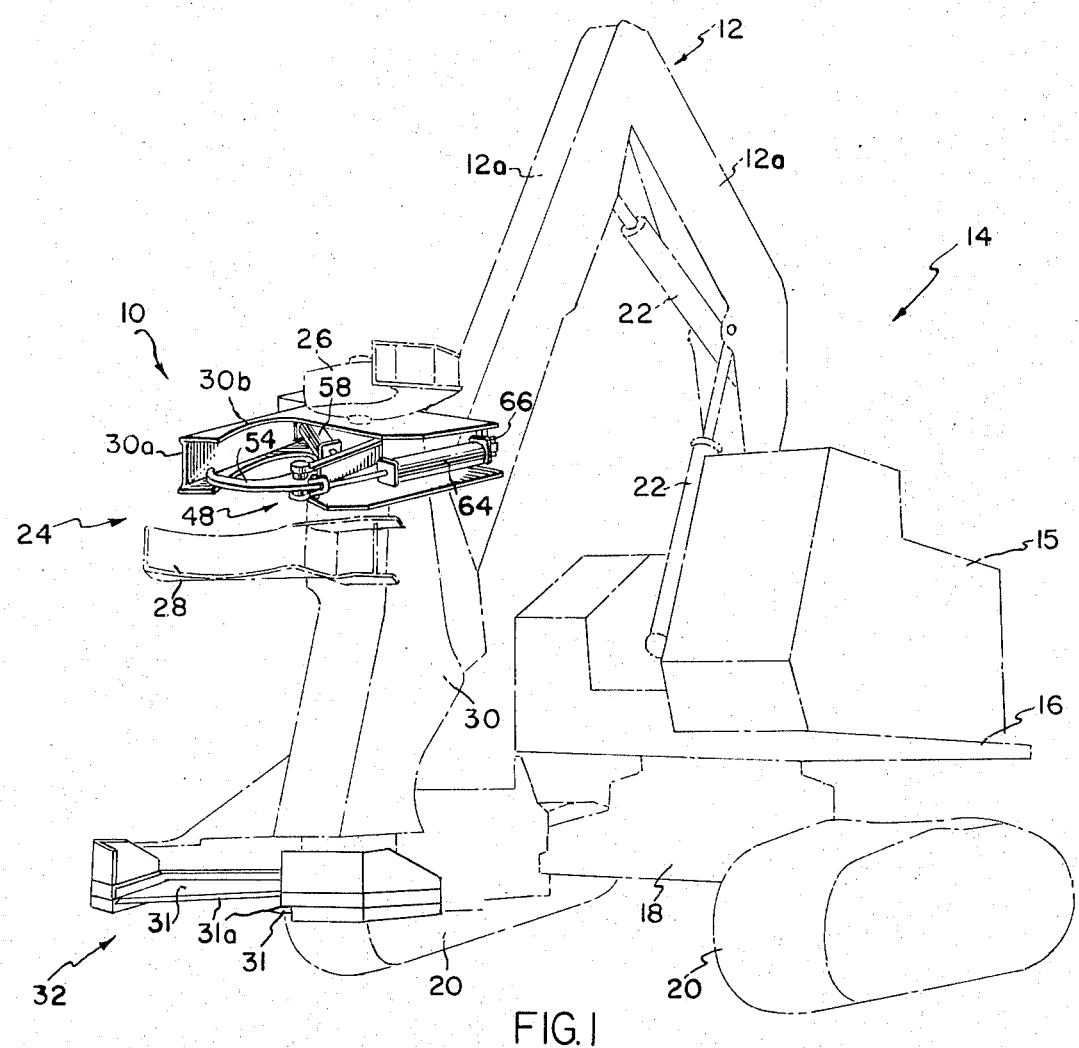
FIG. 1 is a front elevational perspective view illustrating a logging vehicle including tree shearing and grouping apparatus constructed according to the present invention.

Referring in the first instance to FIG. 1, tree shearing and grouping apparatus constructed according to the present invention is particularly adapted for use with a logging or felling vehicle, generally designated 14, having a support platform 16 swingably mounted on a support chassis 18 that is supported for movement along the ground by endless tracks 20 as usual. An operator's cab 15 is supported on the platform 16. A boom assembly, generally designated 12, is articulately mounted on the support platform 16 and includes a plurality of pivotally connected boom sections 12a and hydraulic boom operating cylinders 22, which are more particularly described in the referenced patent which is incorporated herein by reference.

Figure 2:
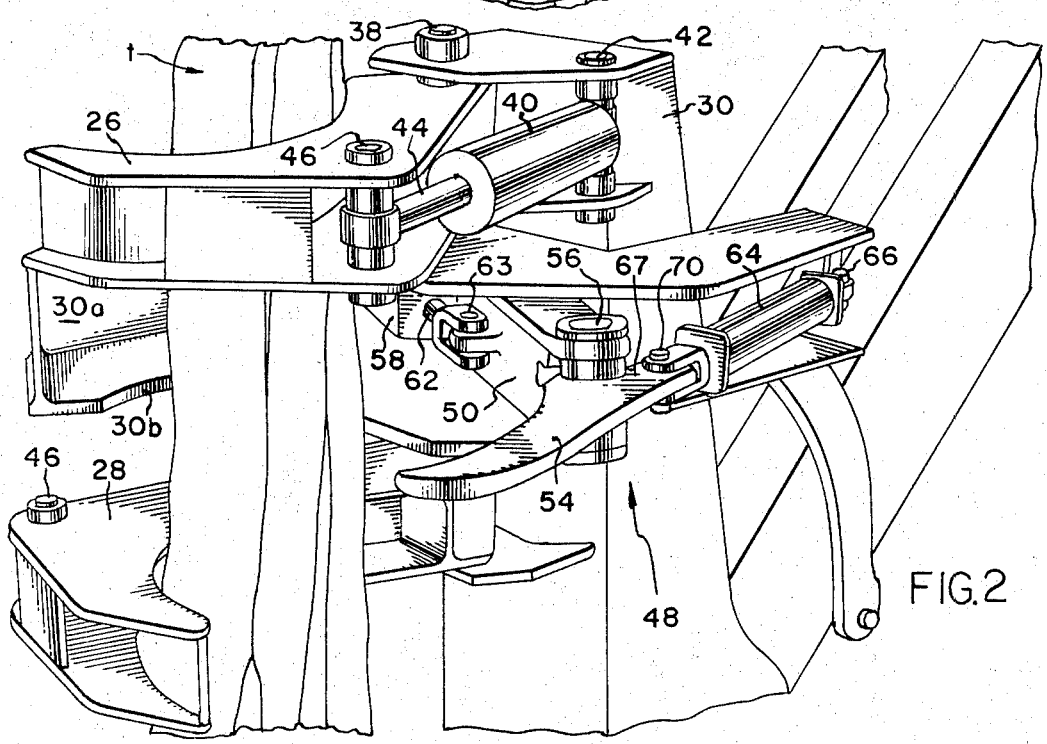
FIG. 2 is an enlarged, front elevational perspective view illustrating a pair of tree clamping members in closed position temporarily holding a group of previously severed trees, and a tree holding finger for subsequently holding the severed trees in a removed, inoperative position.

As is more particularly described in the referenced patent, a tree shearing head, generally designated 10, is mounted on a vertically extending support frame 30 provided at the end of the boom assembly 12 and includes a tree gripping assembly, generally designated 24 having upper and lower, oppositely disposed tree gripping claws or grapple arms 26 and 28 pivotally mounted on the support frame 30 by pivot pins 38 (FIG. 2). For swinging the claws 26 and 28 about the pins 38, double acting, solenoid actuated, fluid operated, cylinders 40 are provided and are pivotally mounted on the frame 30 by pivot pins 42. The preferably hydraulic cylinders 40 include piston rods 44 pivotally connected to the grapple arms 26 and 28 by pivot pins 46. The cylinders 40 are operative to move the upper and lower tree gripping claw members 26 and 28 into engagement with opposite sides of a tree to be severed. The tree shearing head 10 also includes a scissors-like tree shearing assembly, generally designated 32 (FIG. 1) and of the character illustrated in the aforementioned patent, having a pair of cutting or shearing blades 31 with cutting edges 31a which are moved toward and away from each other by suitable hydraulic cylinders, or the like (not shown), to successively shear trees disposed therebetween.

Apparatus for holding a severed tree, which is initially held by the clamping arms 26 and 28, upright so that the clamping arms 26 and 28 can release the tree and move to an open position for receiving another tree, comprises a tree holding finger assembly, generally designated 48, including a mounting bracket 50 pivotally mounted on the frame 30 by a pivot pin 52 and pivotally supporting a holding finger 54 by a pivot pin 56. The finger mounting bracket 50 is swingable between the solid and chain line positions, illustrated in FIG. 5, by a double acting, solenoid actuated, preferably hydraulic, fluid operated cylinder 58 pivotally mounted on the frame 30 by a pin 60 and having a piston rod 62 pivotally connected by, pivot pins 63, to the bracket 50.

Figure 5:
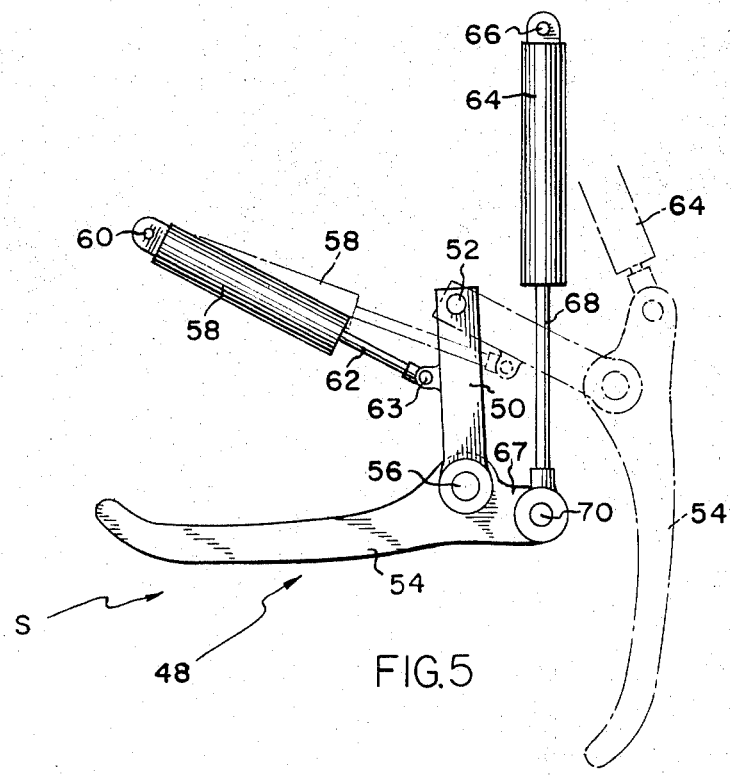
FIG. 5 is a top plan view of the grouping finger assembly only, in tree embracing position, the removed position of the assembly being illustrated in chain lines.

A hydraulically operated, double acting, solenoid actuated cylinder 64 is pivotally mounted on the frame 30 by a pivot pin 66 and includes a piston rod 68 pivotally connected with an offset portion 67 of the holding finger 54 by a pivot pin 70 for swinging the tree holding finger 54 about the axis of the pin 56 so that the finger 54 will move between the tree clamping position, illustrated in solid lines in FIG. 5 and the removed position illustrated in chain lines in FIG. 5. The frame 30 includes a stationary tree receiving backer portion 30a having a curvilinear recess 30b for receiving a group of severed trees t which are held against backer portion 30a by the finger 54.

Figure 4:
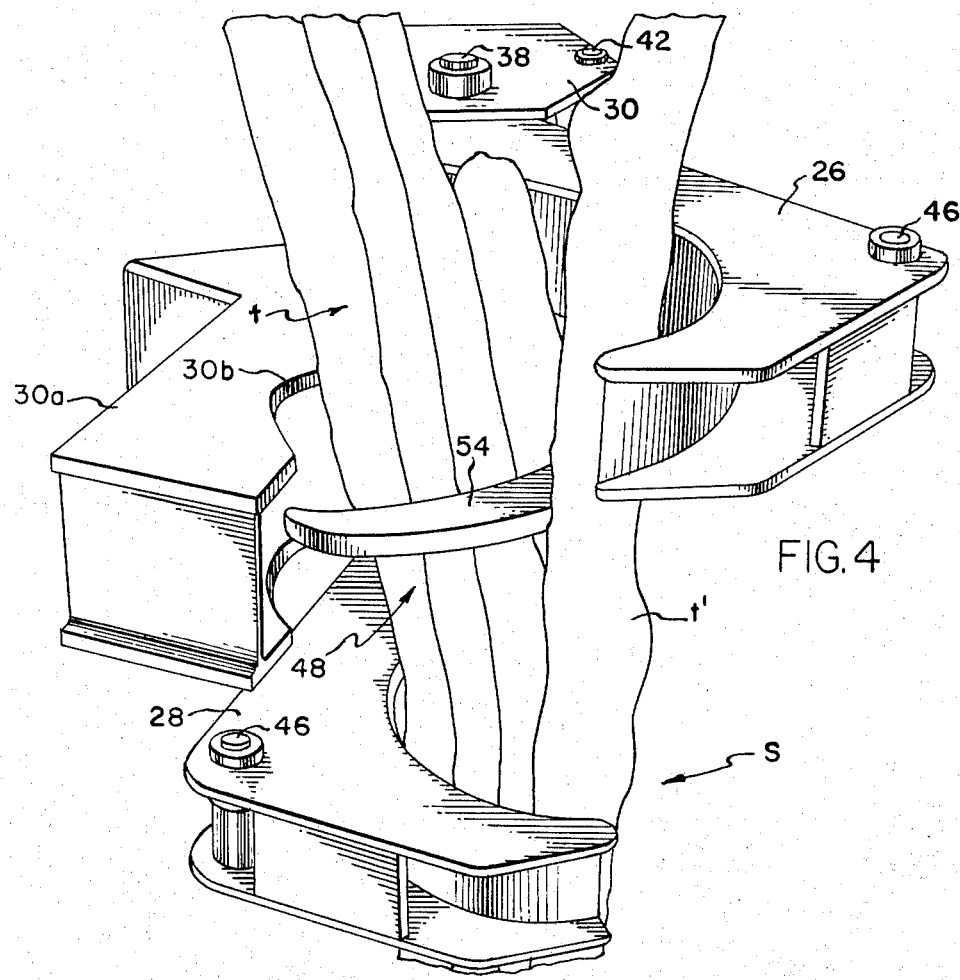
FIG. 4 is an enlarged, front elevational perspective view illustrating the tree clamping members in a closed tree-gripping position holding a subsequently severed tree against the tree holding finger.
Figure 3:
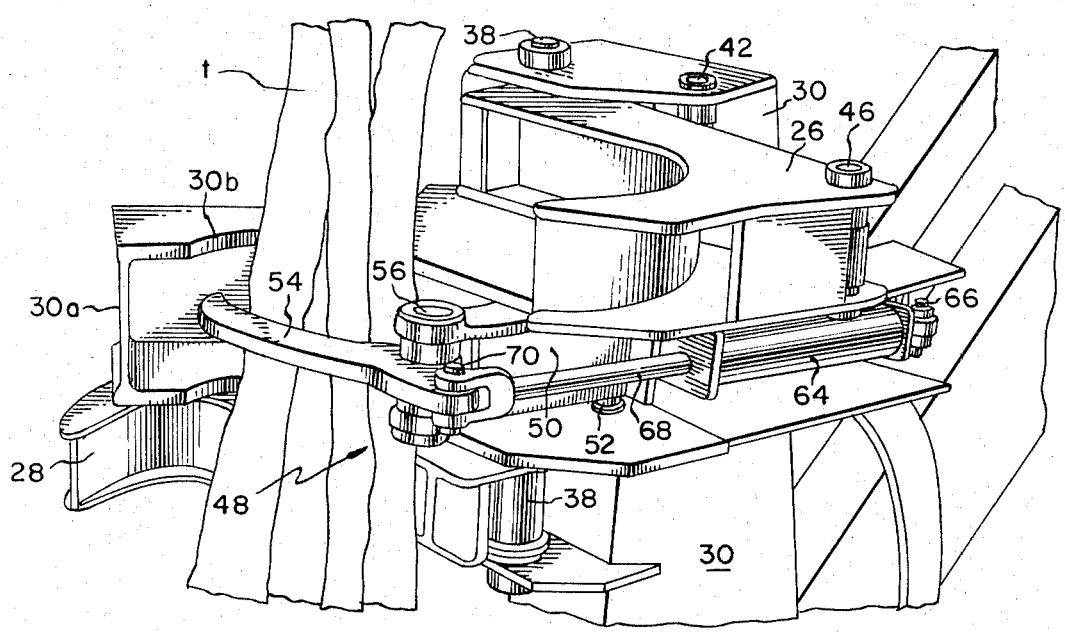
FIG. 3 is an enlarged, front elevational perspective view illustrating the tree clamping members in an open position for receiving another tree to be severed, and the tree holding finger as laterally moved to an operative position to hold the group of severed trees previously held by the tree clamping members.

The claw moving cylinders 40 are operative to move the tree gripping, or claw, members 26 and 28 between the spread apart, tree receiving positions, illustrated in FIG. 3, and the closed, tree clamping positions, illustrated in FIGS. 2 and 4, to initially hold a tree t' to be severed at a tree severing station S where it is subsequently severed by the tree severing assembly 32, and for then moving the severed tree t' into engagement with the previously assembled trees t (FIG. 2), after the holding finger 54 is withdrawn to the removed position, to group the severed trees. The tree holding finger 54 will hold the grouped trees t until the subsequently severed tree t' is moved thereagainst as illustrated in FIG. 4. The finger assembly moving cylinders 58 and 64 are then operated to "snake" the articulately connected finger 54 laterally outwardly between the trees t and t' to a withdrawn position shown in chain lines illustrated in FIG. 5, so that the trees t and t' may be grouped together.

THE OPERATION

It will be assumed that a plurality of relatively small trees t have been previously severed by the tree severing assembly 32 and are embraced by the tree gripping jaws 26 and 28 as illustrated in FIG. 2. The trees t are supported from underneath by the tree shearing blades 31 only when the blades are in closed position. Assuming now that at least another tree t' is to be sheared before transferring all of the trees t and t' as a group to a remote location, the finger operating cylinders 64 and 58 are operated to move the grouping finger 54 from the withdrawn position, illustrated in FIG. 2, to the operative tree-gripping position illustrated in FIG. 3 to embrace the grouped trees t. The tree-holding finger 54 will hold the severed trees t against the stationary frame member 30a in the frame recess 30b. At this time, with the tree shearing blades 31 supporting the trees t from underneath while finger 54 clamps the trees t against the frame part 30a, the jaw operating cylinders 40 are operated to open the tree clamping jaws 26 and 28 to the tree receiving position illustrated in FIG. 3. The tree logging vehicle and the boom 12 are then moved so as to position the tree gripping head 10 adjacent another tree t' to be severed, the tree shearing blades are spread to receive the tree t', and the cylinders 40 are operated in an opposite manner so as to close the tree gripping jaws 26 and 28 to hold the tree t' to be severed. The tree shearing blades 31 are then moved toward each other to shear a tree at the tree cutting station. The tree t' is held tightly against the tree-holding finger 54 by the jaws 26 and 28 as is illustrated in FIG. 4.

To group the severed trees t and t' illustrated in FIG. 4, the finger assembly operating cylinders 64 and 58 are operated to swing the bracket 50 and the finger 54 to the withdrawn position shown in chain lines in FIG. 5. Even though the jaws 26 and 28 press the tree t' against the finger 54 with some force, the two cylinders 58 and 64 are able to "snake" the finger 54 out in a "snaking" path of travel between the trees t and t', to the withdrawn position illustrated in FIG. 2, after which time the jaws 26 and 28 will move the tree t' toward the trees t at the grouping station. The operation can be repeated until a sufficient number of trees are grouped after which time the vehicle 14 can move the entire group of severed trees to a discharge station where they are released.

With the present invention the operator need not move each tree cut or sheared from the place of shearing to a group of trees but, rather, a grouping of trees can be cut and held while additional trees are being cut and then the whole grouping moved to a desired location.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. Apparatus for use at the end of a boom attached to a logging vehicle for severing trees and grouping the severed trees comprising: support means for attachment to the end of the boom; tree-gripping means thereon for successively gripping trees to be severed and successively releasing them after they are severed; tree cutting means on said support means disposed below the tree-gripping means for severing a tree held by said tree-gripping means; articulated withdrawable, rigid, grouping finger parts on said support means forming a finger movable between a removed position for receiving, severed trees released by said tree gripping means and a tree embracing position for embracing and holding the severed trees released by said tree gripping means while a successive tree to be severed and grouped therewith is being held against it by said tree-gripping means; and power operated means for applying separate withdrawing forces to the separate articulated finger parts of said finger to "snake" said finger parts out from under a tree being held against it by said tree gripping means to a removed position.

2. The apparatus set forth in claim 1 wherein said grouping parts are vertically interjacent said tree cutting means and said tree gripping means.

3. The apparatus set forth in claim 1 wherein said tree-gripping means includes a pair of tree-gripping members relatively movable between relatively spread apart tree receiving positions for receiving a tree therebetween and relatively closed, tree-gripping positions for gripping a tree to be severed at a tree cutting station and moving the tree after it is severed to a tree grouping station and temporarily holding it there; said grouping parts comprising tree holding means movable on said support means between a withdrawn, inoperative position and a closed, tree-holding position for holding a severed tree at said tree grouping station when said tree-gripping means are moved to said spread apart positions; said power operated means moving said tree holding means from said withdrawn position to said tree holding position to hold a tree at said tree grouping station and moving said tree holding means from said tree holding position to said withdrawn position out of the path of successively severed trees when said tree-gripping means are in said closed position to permit successively severed trees held at said tree grouping station by said tree-gripping means to be moved in said path of travel by said tree-gripping means and grouped with any trees at said tree grouping station.

4. The apparatus of claim 3 wherein said tree cutting means comprises tree nipping means having a pair of blades relatively movable toward and away from each other between spaced apart, open positions for receiving a tree therebetween and closed positions for severing a tree held by said gripping means.

5. The apparatus of claim 3 wherein said tree-gripping means holds successively cut trees against said tree holding means until said tree holding means moves out of the path of travel of said successively cut trees to permit the successively severed trees to move forwardly to said grouping station.

6. The apparatus set forth in claim 4 wherein said tree-gripping means includes a pair of relatively movable gripping claws disposed above said blades for enveloping and gripping a tree.

7. The apparatus set forth in claim 6 wherein said gripping claws are vertically spaced and pivotably mounted on said support means for movement toward and away from each other between spread apart and relatively closed positions to grip opposite sides of a tree to be severed.

8. The apparatus set forth in claim 1 wherein said grouping finger parts include a first finger part constituting a mounting bracket pivotal about a first vertical axis and connected with said power operated means for swinging said mounting bracket about said first vertical axis between a removed position and a position adjacent a severed tree held by said tree-gripping means, and a tree-holding finger, pivotally mounted on said mounting bracket for swinging movement thereon between a withdrawn position and an operative position embracing a severed tree held by said tree-gripping means, said tree gripping means including tree clamping jaw means movable between removed and operative positions gripping a tree to be severed and means for moving said jaw means to said operative position to hold a tree to be severed and for moving said jaw means to said removed position to receive another tree when said tree-holding finger is moved to said operative position; said tree grouping parts further including means for withdrawing said gripping finger from said operative position to said withdrawn position when said bracket means is being moved to said removed position to permit successively severed trees to be grouped together.

9. The apparatus of claim 1 wherein said tree-gripping means is operative to hold a severed tree in engagement with a tree grouping part in said operative position and to move the last severed tree and the previously severed trees together when said grouping part is withdrawn.

10. The combination as set forth in claim 1 wherein said tree-gripping means comprises a pair of opposing claws mounted for pivotal movement on said support means to swing in opposing directions and embrace a tree, and a stationary recessed gripper surface on said support means, against which said claws hold trees to be supported.

11. The apparatus set forth in claim 10 wherein said power operating means comprises separate power operated rams for operating the separate finger parts.

12. The combination defined in claim 10 in which said claws are power-operated independently of said finger parts.

* * * * *